United States Patent
Xiong et al.

(10) Patent No.: US 11,020,853 B2
(45) Date of Patent: Jun. 1, 2021

(54) ROBOT, METHOD FOR CONTROLLING MOTION OF A ROBOT AND NON-TRANSITORY READABLE MEDIUM

(71) Applicant: UBTECH ROBOTICS CORP., Shenzhen (CN)

(72) Inventors: Youjun Xiong, Shenzhen (CN); Ruohu Yang, Shenzhen (CN); Lihai Mei, Shenzhen (CN); Yidan Wang, Shenzhen (CN); Shaochun Li, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 311 days.

(21) Appl. No.: 16/231,967

(22) Filed: Dec. 25, 2018

(65) Prior Publication Data

US 2019/0329408 A1    Oct. 31, 2019

(30) Foreign Application Priority Data

Apr. 28, 2018    (CN) .......................... 201810401936.3

(51) Int. Cl.
*B25J 9/16* (2006.01)
*B25J 11/00* (2006.01)

(52) U.S. Cl.
CPC ........... *B25J 9/1664* (2013.01); *B25J 9/1653* (2013.01); *B25J 11/0035* (2013.01)

(58) Field of Classification Search
CPC ...... B25J 9/1664; B25J 9/1653; B25J 9/1682; B25J 11/0035
See application file for complete search history.

(56) References Cited

U.S. PATENT DOCUMENTS 10,814,483 B2 * 10/2020 Kishi ...................... G06T 13/40

FOREIGN PATENT DOCUMENTS

| CN | 2012196381 A | 10/2012 |
| CN | 105785821 A | 7/2016 |
| JP | 200417894 | * 4/2011 |
| JP | 2012196381 | * 10/2012 |

* cited by examiner

*Primary Examiner* — Abby Y Lin
*Assistant Examiner* — Dylan M Katz

(57) ABSTRACT

The present disclosure relates to intelligent control technology, and provides a robot, a method for controlling motion of a robot and a non-transitory readable medium. The method includes: acquiring current motion state of the robot; when the robot is in abnormal motion state, storing received data; when the robot returns to normal motion state, acquiring restoring time for the robot to return from the abnormal motion state to the normal motion state; and controlling the robot to perform a corresponding action after the robot returns to the normal motion state. In this way when multiple robots perform synchronized tasks and one of them is interrupted, this robot may perform the corresponding action based on the fault duration and the data which correspond to the action the robot needs to perform in the normal motion state. Thus, this robot may keep its actions consistent with the others.

20 Claims, 2 Drawing Sheets

ROBOT, METHOD FOR CONTROLLING MOTION OF A ROBOT AND NON-TRANSITORY READABLE MEDIUM

CROSS-REFERENCE TO RELATED APPLICATIONS

The present application claims foreign priority of Chinese Patent Application No. 201810401936.3, filed on Apr. 28, 2018 in the National Intellectual Property Administration of China, the entire contents of which are hereby incorporated by reference.

TECHNICAL FIELD

The present disclosure generally relates to intelligent control technology, and in particular to a robot, a method for controlling motion of a robot and a non-transitory readable medium.

BACKGROUND

The robot is an apparatus which is capable of automatically accomplishing certain tasks. The robot can be controlled directly by human, run pre-programmed instructions, or act based on the technology of artificial intelligence. Thus, robots can be utilized in various technical fields. For example, robots can be utilized to give a performance such as dance. Multiple robots may participate in the performance and perform synchronized actions. However, it is possible that actions of some of the robots may be interrupted for certain reasons. When these robots try to pick back up their actions, their actions may be different from those of the others, which may influence the performance's quality.

SUMMARY

Accordingly, the present disclosure provides a robot, a method and an apparatus for controlling motion of a robot in order to solve the problem that when multiple robots perform synchronized actions and one of them malfunctions, this robot cannot keep its actions consistent with the others after the fault is eliminated.

To solve the above-mentioned problem, a technical scheme adopted by the present disclosure is to provide a method for controlling motion of a robot. The method includes: acquiring current motion state of the robot, wherein motion states comprises normal motion state and abnormal motion state; when the robot is in the abnormal motion state, storing received data which correspond to an action the robot needs to perform in the normal motion state; when it is detected that the robot returns to the normal motion state, acquiring restoring time spent by the robot for returning from the abnormal motion state to the normal motion state; based on the received data which correspond to the action the robot needs to perform in the normal motion state and the restoring time, controlling the robot to continue to perform a corresponding action after the robot returns to the normal motion state.

To solve the above-mentioned problem, another technical scheme adopted by the present disclosure is to provide a robot. The robot includes a memory and a processor. The memory is configured to store program instructions, and the processor is configured to execute the program instructions and perform the above-described method for controlling motion of a robot.

To solve the above-mentioned problem, another technical scheme adopted by the present disclosure is to provide a non-transitory readable medium. The non-transitory readable medium includes program instructions that when executed by a processor, cause the processor to perform the above-described method for controlling motion of a robot.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Figure 1:
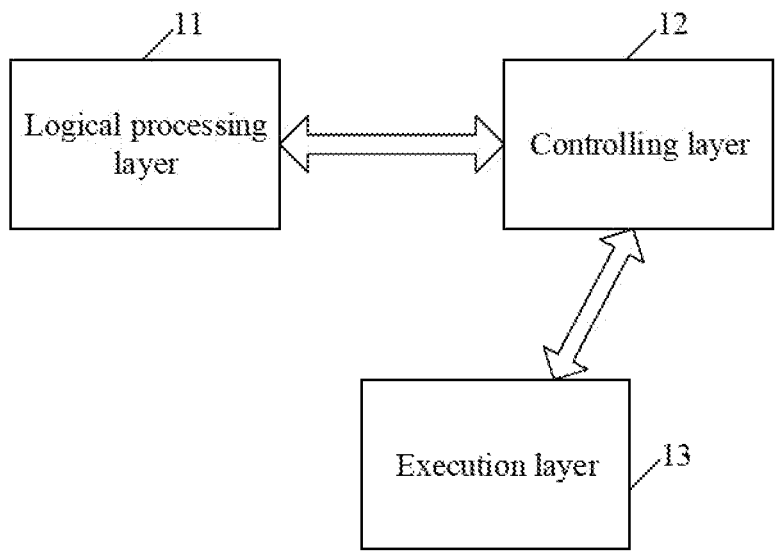
FIG. 1 shows the architecture of a motion control system of a robot according to an embodiment of the present disclosure.

Referring to FIG. 1, the motion control system of a robot may include a logical processing layer 11, a controlling layer 12 and an execution layer 13. The logical processing layer 11 may be utilized to acquire the current motion state of the robot. Motion states of the robot include normal motion state in which the robot may perform predetermined actions and abnormal motion state which means the robot is in the fault state. If the robot is in the abnormal motion state, the received data which correspond to the action the robot needs to perform in the normal state may be stored by the controlling layer. When the robot returns to the normal motion state, the restoring time spent for the robot to return from the abnormal motion state to the normal motion state may be acquired. Based on the restoring time and the received data which correspond to the action the robot needs to perform in the normal state, the robot may be controlled to continue to perform a corresponding action.

In order to better explain the technical schemes of the present disclosure, various embodiments of the present disclosure are given below.

First Embodiment

Figure 2:
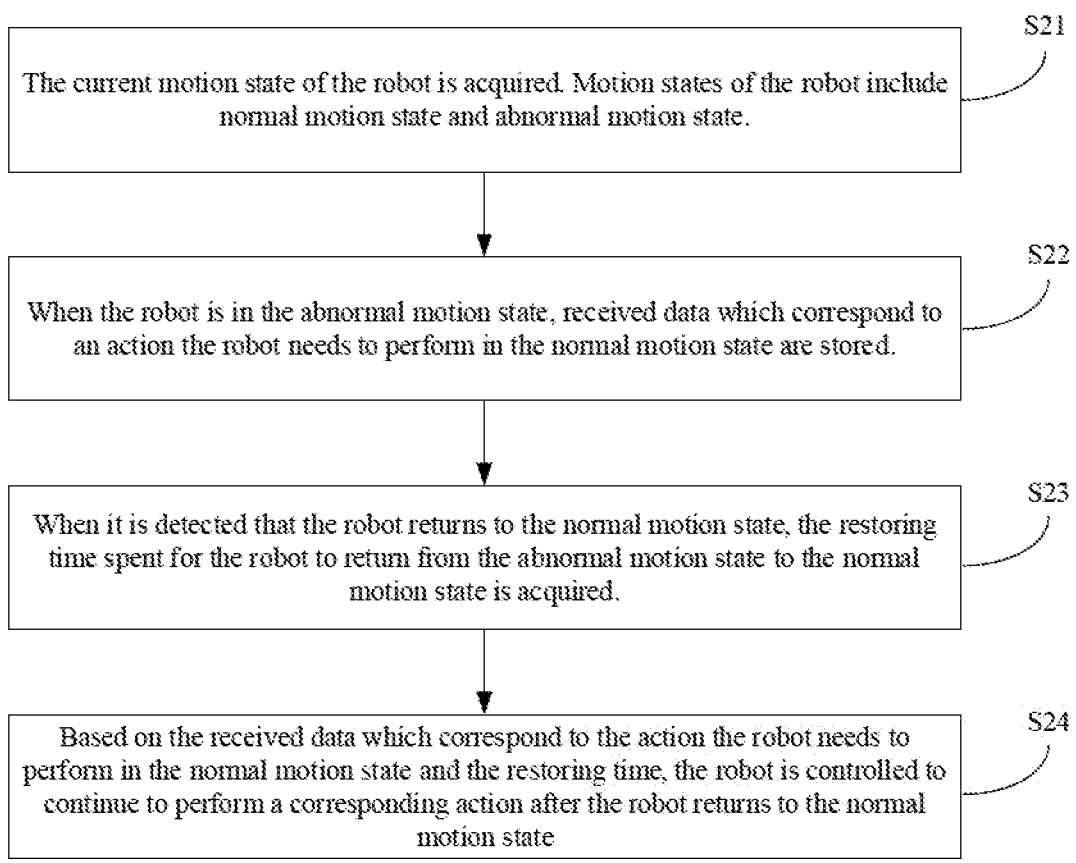
FIG. 2 is a flow chart of a method for controlling motion of a robot according to an embodiment of the present disclosure.

FIG. 2 shows a flow chart of a method for controlling motion of a robot according to an embodiment of the present disclosure. The method may include operations described in the following blocks S21-S24.

S21: The current motion state of the robot is acquired. Motion states of the robot include normal motion state and abnormal motion state.

According to an embodiment of the present disclosure, the logical processing layer and the controlling layer of the robot may be connected via the I²C interface so as to communicate with each other. The logical processing layer may include the Raspbian system. Correspondingly, the controlling layer may include the STM32 system. The logical processing layer may acquire the motion data of the robot from the controlling layer so as to determine the current motion state of the robot based on the acquired motion data. Motion states of the robot include normal motion state in which the robot may perform predetermined actions and abnormal motion state which means the robot is in the fault state (e.g., falling down).

In some embodiments, the step that acquiring by the logical processing layer the current motion state of the robot may include:
  acquiring by the logical processing layer periodically motion data detected by a sensor installed in the robot; and
  based on the acquired motion data, determining the current motion state of the robot.

In this operation, motion data detected by the sensor installed in the robot may be periodically acquired by the logical processing layer. Specifically, the logical processing layer may periodically read the motion data from the controlling layer via the I²C interface. The motion data may include speed, angular position or other parameters of various components of the robot. The sensor may include, for example, 3-axis gyroscope. Then, the current motion state of the robot may be determined based on the acquired motion data.

S22: When the robot is in the abnormal motion state, received data which correspond to an action the robot needs to perform in the normal motion state are stored.

In this operation, if the robot is in the abnormal motion state, the received data which correspond to an action the robot needs to perform in the normal motion state may be stored by the controlling layer. Specifically, when the logical processing layer determines that the robot is currently in the abnormal motion state, the logical processing layer may send a motion interruption message to the control layer via the I²C interface. After having received the motion interruption message, the controlling layer may send an acknowledgement (ACK) to the logical processing layer in response, and stop to send the data which correspond to an action the robot needs to perform in the normal motion state to the servo control system of the robot. Instead, the control layer may store these data.

S23: When it is detected that the robot returns to the normal motion state, the restoring time spent for the robot to return from the abnormal motion state to the normal motion state is acquired.

In some embodiments, the logical processing layer may continue to acquire the current motion state of the robot based on the operation of S21. When it is detected that the robot returns to the normal motion state, the restoring time T spent for the robot to return from the abnormal motion state to the normal motion state may be counted.

In some embodiments, the step of acquiring the restoring time spent for the robot to return from the abnormal motion state to the normal motion state may include:
  based on the acquired motion data, determining the time point $T_a$ where the robot enters the abnormal motion state, and the time point $T_b$ where the robot returns to the normal motion state; and
  taking a difference value between the time point $T_a$ and the time point $T_b$ as the restoring time T.

The logical processing layer may record the detected time point $T_a$ where the robot enters the abnormal motion state and the time point $T_b$ where the robot returns to the normal motion state. The restoring time for the robot to return from the abnormal motion state to the normal motion state is equal to the difference value between $T_a$ and $T_b$.

S24: Based on the received data which correspond to the action the robot needs to perform in the normal motion state and the restoring time, the robot is controlled to continue to perform a corresponding action after the robot returns to the normal motion state.

According to some embodiments of the present disclosure, when detecting that the robot returns to the normal motion state, the logical processing layer may send a recover message to the controlling layer via the I²C interface. Based on the data which correspond to the action the robot needs to perform in the normal motion state and the restoring time for the robot to return from the abnormal motion state to the normal motion state, the action(s) the robot needs to continue to perform after it returns to the normal motion state may be determined. Then data corresponding to such action(s) may be sent to the controlling layer. When receiving the recover message, the controlling layer may send an ACK to the logical processing layer in response, and control the robot to perform the corresponding action(s) based on the data of the action(s) the robot needs to continue to perform after it returns to the normal motion state.

In some embodiments, the step of controlling the robot to continue to perform a corresponding action after the robot returns to the normal motion state based on the received data which correspond to the action the robot needs to perform in the normal motion state may include:
  based on the received data which correspond to the action the robot needs to perform in the normal motion state, acquiring necessary time $T_n$, $T_{(n+1)}$, ..., $T_{(n+k)}$, ..., $T_{(m-1)}$ corresponding to different actions $A_n$, $A_{(n+1)}$, ..., $A_{(n+k)}$, ..., $A_{(m-1)}$ and a delay T', wherein $T_n+T_{(n+1)}+ \ldots +T_{(n+k)}+ \ldots +T_{(m-1)}+T'=T$;
  if $T'<T_m$, taking an action $A_m$ corresponding to the time $T_m$ as the action that the robot needs to perform after returning to the normal motion state; and
  controlling the robot which has returned to the normal motion state to continue to perform the action $A_m$ by a controlling layer.

In some embodiments, the step of controlling the robot which has returned to the normal motion state to continue to perform the action $A_m$ by a controlling layer may include:
  acquiring data corresponding to the action $A_m$ and offset data corresponding to a portion of the action $A_m$ which has been performed during the delay T';
  sending the data corresponding to the action $A_m$ and the offset data to the controlling layer;
  controlling the robot to continue to perform actions corresponding to all data of the action $A_m$ except for the offset data.

In the file of an action, the parameter of frame state may define how many frames the action contains and how much time each frame takes. Thus, it is possible to identify those data corresponding to the actions which have been performed during the delay T' based on the length of each frame, and these data are called offset data. The logical processing layer may send the file of the action $A_m$ and the offset data to the controlling layer. Accordingly, after the robot returns to the normal motion state, based on the received data, the controlling layer may control the robot to perform the portion of the action $A_m$ which has not been performed.

According to the present disclosure, the motion control system of the robot includes a logical processing layer, a controlling layer and an execution layer. The current motion state of the robot may be acquired by the logical processing layer. Motion states of the robot may include normal motion state in which the robot may perform predetermined actions and abnormal motion state which means the robot is in the fault state. When the robot is in the abnormal motion state, the received data which correspond to the action the robot needs to perform in the normal motion state may be stored by the controlling layer. When the robot returns to the normal motion state, the restoring time spent for the robot to return from the abnormal motion state to the normal motion state may be acquired. Then, based on the received data which correspond to the action the robot needs to perform in the normal motion state and the restoring time, the robot may be controlled by the controlling layer to continue to perform a corresponding action after the robot returns to the normal motion state. In this way, when multiple robots perform synchronized tasks and one of them is interrupted for a certain reason, this robot may perform the corresponding action based on the fault duration and the data which correspond to the action the robot needs to perform in the normal motion state. Thus, this robot may keep its actions consistent with the others.

Second Embodiment

Figure 3:
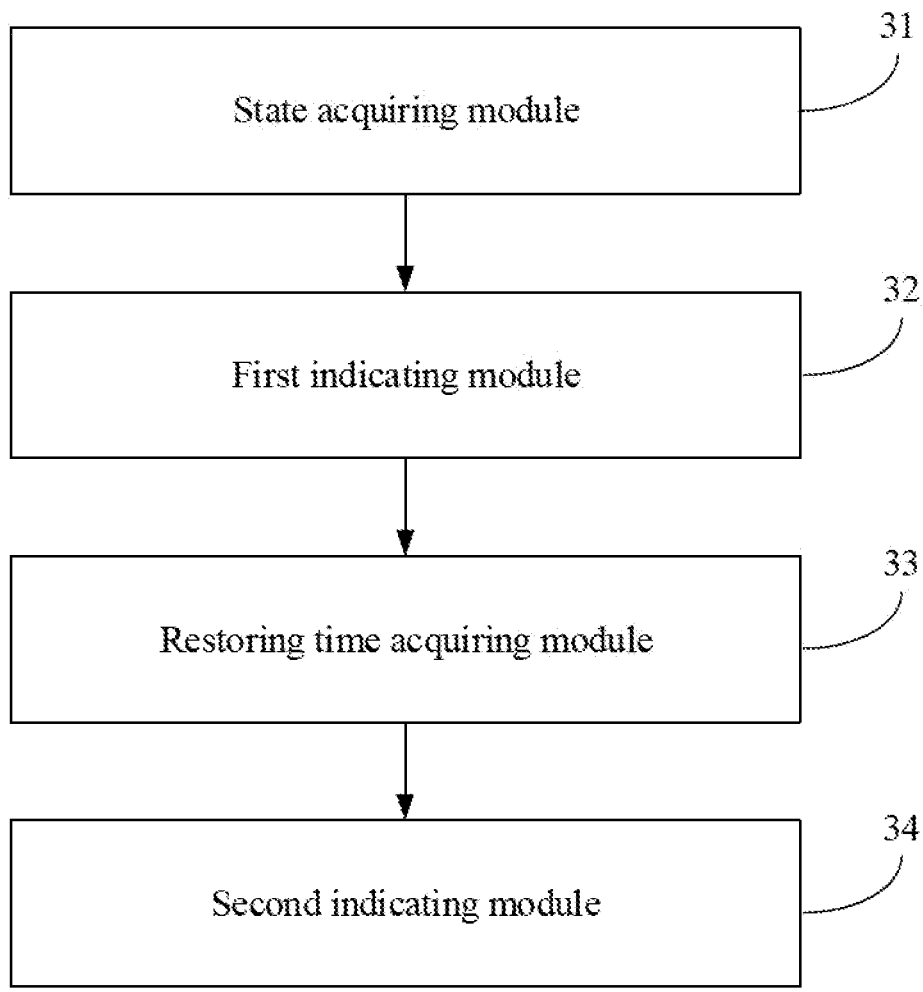
FIG. 3 is a structural diagram of a motion control apparatus according to an embodiment of the present disclosure.

FIG. 3 shows a structural diagram of an apparatus for controlling motion of a robot according to an embodiment of the present disclosure. The motion control apparatus corresponds to the above-described method. In order to better illustrate the purpose and principle of the present disclosure, only some relevant parts of the apparatus are shown.

Referring to FIG. 3, the apparatus may include a state acquiring module 31, a first indicating module 32, a restoring time acquiring module 33 and a second indicating module 34.

The state acquiring module 31 may be utilized to acquire current motion state of the robot. Motion states comprises normal motion state and abnormal motion state.

The first indicating module 31 may be utilized to, when the robot is in the abnormal motion state, store received data which correspond to an action the robot needs to perform in the normal motion state.

The restoring time acquiring module 33 may be utilized to, when it is detected that the robot returns to the normal motion state, acquire restoring time spent for the robot to return from the abnormal motion state to the normal motion state.

The second indicating module 34 may be utilized to, after the robot returns to the normal motion state, control the robot to continue to perform a corresponding action based on the received data which correspond to the action the robot needs to perform in the normal motion state and the restoring time.

In some embodiments, the state acquiring module 31 may include a motion data acquiring unit and a motion state determination unit. The motion data acquiring unit may be configured to acquire periodically motion data detected by a sensor installed in the robot by a logical processing layer.

The motion state determination unit may be configured to determine the current motion state of the robot based on the acquired motion data.

In some embodiments, the restoring time acquiring module 33 may perform the following operations: based on the acquired motion data, determining a first time point $T_a$ where the robot enters the abnormal motion state, and a second time point $T_b$ where the robot returns to the normal motion state; and taking a difference value between the first time point $T_a$ and the second time point $T_b$ as the restoring time T.

In some embodiments, the second indicating module 34 may include a time acquiring unit and an action determination unit. The time acquiring unit may be configured to acquire necessary time $T_n$, $T_{(n+1)}$, ..., $T_{(n+k)}$, ..., $T_{(m-1)}$ corresponding to different actions $A_n$, $A_{(n+1)}$, ..., $A_{(n+k)}$, ..., $A_{(m-1)}$ and a delay T' based on the received data which correspond to the action the robot needs to perform in the normal motion state, wherein $T_n+T_{(n+1)}+ \ldots + T_{(n+k)}+ \ldots +T_{(m-1)}+T'=T$. The action determination unit may be configured to, if $T'<T_m$, determine $A_m$ corresponding to the time $T_m$ as the action that the robot needs to perform after returning to the normal motion state, and to control the robot which has returned to the normal motion state to continue to perform the action $A_m$ by a controlling layer.

In some embodiments, the action determination unit may further be configured to perform the following operations: acquiring data corresponding to the action $A_m$ and offset data corresponding to a portion of the action $A_m$ which has been performed during the delay T'; sending the data corresponding to the action $A_m$ and the offset data to the controlling layer; controlling the robot to continue to perform actions corresponding to all data of the action $A_m$ except for the offset data.

According to the present disclosure, the motion control system of the robot includes a logical processing layer, a controlling layer and an execution layer. The current motion state of the robot may be acquired by the logical processing layer. Motion states of the robot may include normal motion state in which the robot may perform predetermined actions and abnormal motion state which means the robot is in the fault state. When the robot is in the abnormal motion state, the received data which correspond to the action the robot needs to perform in the normal motion state may be stored by the controlling layer. When the robot returns to the normal motion state, the restoring time spent for the robot to return from the abnormal motion state to the normal motion state may be acquired. Then, based on the received data which correspond to the action the robot needs to perform in the normal motion state and the restoring time, the robot may be controlled by the controlling layer to continue to perform a corresponding action after the robot returns to the normal motion state. In this way, when multiple robots perform synchronized tasks and one of them is interrupted for a certain reason, this robot may perform the corresponding action based on the fault duration and the data which correspond to the action the robot needs to perform in the normal motion state. Thus, this robot may keep its actions consistent with the others.

It should be understood that the sequence number of each step in the above embodiments does not mean that the order of execution. The order of execution of each operation should be determined by its function and internal logic, and should not be construed as limiting the implementation process of the embodiments of the present disclosure.

Third Embodiment

Figure 4:
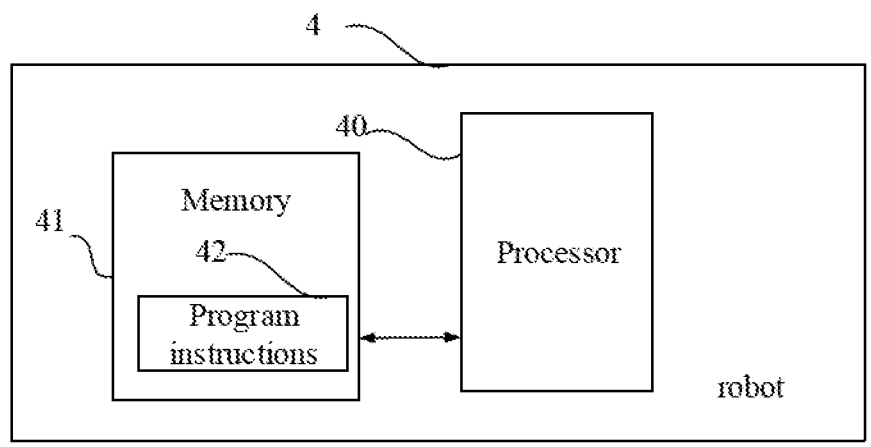
FIG. 4 is a structural diagram of a robot according to an embodiment of the present disclosure.

FIG. 4 is a structural diagram of a robot according to an embodiment of the present disclosure. As shown in FIG. 4, the robot 4 may include a processor 40 and a memory 41. The memory 40 may be utilized to store program instructions 42. The processor 40 may be utilized to execute the program instructions 42 so as to realize the above-described operations for controlling motion of the robot, as illustrated in S21~S24. Alternatively, the processor 40 may be utilized to execute the program instructions 42 so as to realize the functions of the above-described modules/units, such as modules 31~34 of FIG. 3.

In some embodiments, the program instructions 42 may be divided into one or more modules/units. The modules/units may be stored in the memory 41, and may be executed by the processor 40. The modules/units refer to computer program codes which have certain functions. These codes may describe the processes of how the program instructions 42 are executed in the robot 4. For example, the program instructions 42 may be divided into a state acquiring module, a first indicating module, a restoring time acquiring module and a second indicating module.

The state acquiring module 31 may be utilized to acquire current motion state of the robot. Motion states comprises normal motion state and abnormal motion state.

The first indicating module 31 may be utilized to, when the robot is in the abnormal motion state, store received data which correspond to an action the robot needs to perform in the normal motion state.

The restoring time acquiring module 33 may be utilized to, when it is detected that the robot returns to the normal motion state, acquire restoring time spent for the robot to return from the abnormal motion state to the normal motion state.

The second indicating module 34 may be utilized to, after the robot returns to the normal motion state, control the robot to continue to perform a corresponding action based on the received data which correspond to the action the robot needs to perform in the normal motion state and the restoring time.

In some embodiments, the state acquiring module 31 may include a motion data acquiring unit and a motion state determination unit. The motion data acquiring unit may be configured to acquire periodically motion data detected by a sensor installed in the robot by a logical processing layer. The motion state determination unit may be configured to determine the current motion state of the robot based on the acquired motion data.

In some embodiments, the restoring time acquiring module 33 may perform the following operations: based on the acquired motion data, determining a first time point $T_a$ where the robot enters the abnormal motion state, and a second time point $T_b$ where the robot returns to the normal motion state; and taking a difference value between the first time point $T_a$ and the second time point $T_b$ as the restoring time T.

In some embodiments, the second indicating module 34 may include a time acquiring unit and an action determination unit. The time acquiring unit may be configured to acquire necessary time $T_n$, $T_{(n+1)}$, ..., $T_{(n+k)}$, ..., $T_{(m-1)}$ corresponding to different actions $A_n$, $A_{(n+1)}$, ..., $A_{(n+k)}$, ..., $A_{(m-1)}$ and a delay T' based on the received data which correspond to the action the robot needs to perform in the normal motion state, wherein $T_n+T_{(n+1)}+ ... + T_{(n+k)}+ ... +T_{(m-1)}+T'=T$. The action determination unit may be configured to, if $T'<T_m$, determine $A_m$ corresponding to the time $T_m$ as the action that the robot needs to perform after returning to the normal motion state, and to control the robot which has returned to the normal motion state to continue to perform the action $A_m$ by a controlling layer.

In some embodiments, the action determination unit may further be configured to perform the following operations: acquiring data corresponding to the action $A_m$ and offset data corresponding to a portion of the action $A_m$ which has been performed during the delay T'; sending the data corresponding to the action $A_m$ and the offset data to the controlling layer; controlling the robot to continue to perform actions corresponding to all data of the action $A_m$ except for the offset data.

The robot may include (not limited to) the processor 40 and the memory 41. Those of ordinary skill should understand, the structure shown in FIG. 4 is just an example of the robot 4 rather than a limitation. In other embodiments, the robot may include more or less components. Some component may be combined together. Different types of components may be employed. For example, the robot may further include an I/O device, network accessing device, communication bus etc.

The processor 40 may be a central processing unit (CPU), other general-purpose processor, digital signal processor (DSP), application specific integrated circuit (ASIC), field-programmable gate array (FPGA), other programmable logic device, discrete gates or transistor logic devices, discrete hardware components, etc. The general-purpose processor may be a microprocessor or any other conventional processor.

The memory 41 may be an internal storage unit of the robot 4 such as the hard disk or memory of the robot 4. Alternatively, the memory 41 may be an external storage device of the robot 4 such as plug-in hard disk, smart media card (SMC), secure digital (SD) card, flash card and the like. In some embodiments, the memory 41 may include both the internal and external storage units of the robot 4. The memory 41 may be utilized to store program instructions and other programs and data necessary for the robot. The memory 41 may also be utilized to temporarily store those data which have been sent or will soon be sent.

It can be clearly understood by persons skilled in the art that, for the purpose of convenient and brief description, only the foregoing division of the functional units and components is taken as an example for illustration. However, in actual applications, the foregoing functions can be allocated for being completed by different functional units or components according to the needs, i.e. dividing the internal structure of an apparatus into different functional units or components to complete all or some of the foregoing functions. Various functional units and components in the embodiments may be integrated into one processing unit, or each of the units may exist alone physically, or two or more units are integrated into one unit, and the foregoing integrated unit may be implemented in a form of hardware, or may also be implemented in a form of a software function unit. In addition, the specific names of all functional units and components are only intended to distinguish between each other, but are not used to limit the protection scope of the present application. For the specific working process of the units and components in the foregoing apparatus, reference may be made to the corresponding process in the foregoing method embodiments, and details are not described herein again.

In the foregoing embodiments, the description in each embodiment has respective focus. For a part that is not described in a certain embodiment, reference may be made to related descriptions in other embodiments.

The one having ordinary skill in the art understand that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. The one having ordinary skill in the art can use different ways to realize the function for each specific application while such realizations should not go beyond the scope of the present disclosure.

In several embodiments provided in the present disclosure, it should be understood that the disclosed systems, apparatuses, and methods may be implemented in other ways. For example, the embodiments of the apparatuses described above are merely illustrative, for example, the division of units is a logical function division only, and there may be another division in actually implementing. For example, multiple units or components may be combined or may be integrated into another system, or some features may be ignored or not executed. In other respects, the shown or discussed coupling or direct coupling or communication connection between each other may be via interfaces, and the indirect coupling or communication connection between apparatuses or units, which may be electrical, mechanical, or otherwise.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random-access memory (RAM), a floppy disk, or other kinds of media capable of storing program codes.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A method for controlling motion of a robot, comprising:
  acquiring current motion state of the robot, wherein motion states comprises normal motion state and abnormal motion state;
  when the robot is in the abnormal motion state, storing received data which correspond to an action the robot needs to perform in the normal motion state;
  when it is detected that the robot returns to the normal motion state, acquiring restoring time spent for the robot to return from the abnormal motion state to the normal motion state; and
  based on the received data which correspond to the action the robot needs to perform in the normal motion state and the restoring time, controlling the robot to continue to perform a corresponding action after the robot returns to the normal motion state:
  wherein the step of based on the received data which correspond to the action the robot needs to perform in the normal motion state and the restoring time, controlling the robot to continue to perform the corresponding action after the robot returns to the normal motion state comprises:
  based on the received data which correspond to the action the robot needs to perform in the normal motion state, acquiring necessary time $T_n$, $T_{(n+1)}$, ..., $T_{(n+k)}$, ..., $T_{(m-1)}$ corresponding to different actions $A_n$, $A_{(n+1)}$, ..., $A_{(n+k)}$, ..., $A_{(m-1)}$ and a delay T', wherein $T_n + T_{(n+1)} + ... + T_{(n+k)} + ... + T_{(m-1)} + T' = T$:
  if $T' < T_m$, taking an action $A_m$ corresponding to the time $T_m$ as the action that the robot needs to perform after returning to the normal motion state; and
  controlling the robot which has returned to the normal motion state to continue to perform the action $A_m$ by a controlling layer in a motion control system of the robot.

2. The method of claim 1, wherein the motion control system further comprises a logical processing layer connected to the controlling layer via a I²C interface, and the acquiring the current motion state of the robot comprises:
  acquiring periodically motion data detected by a sensor installed in the robot by the logical processing layer, wherein the motion data is read from the controlling layer via the I²C interface; and
  based on the acquired motion data, determining, by the logical processing layer, the current motion state of the robot.

3. The method of claim 2, wherein the acquiring the restoring time spent for the robot to return from the abnormal motion state to the normal motion state comprises:
  based on the acquired motion data, determining a first time point where the robot enters the abnormal motion state, and a second time point where the robot returns to the normal motion state; and
  taking a difference value between the first time point and the second time point as the restoring time.

4. The method of claim 3, wherein
  the action the robot needs to perform in the normal motion state comprises a plurality of sub-actions;
  the action $A_m$ is one sub-action $A_m$ of the plurality of sub-actions begin time of $A_m$ is no later than the second time point and end time of $A_m$ is later than the second time point.

5. The method of claim 4, wherein the controlling the robot to continue to perform the corresponding action after the robot returns to the normal motion state comprises;
  acquiring, all data corresponding to the sub-action $A_m$ and offset data, wherein the offset data correspond to a portion of the sub-action $A_m$ which has been performed before the second time point;
  sending all the data corresponding to the sub-action $A_m$ and the offset data to the controlling layer; and
  controlling the robot to continue to perform operations corresponding to all data of the sub-action $A_m$ except for the offset data.

6. The method of claim 2, wherein the sensor comprises a 3-axis gyroscope, and the motion data comprises speed and angular position of various components of the robot.

7. The method of claim 2, wherein the step of when the robot is in the abnormal motion state, storing the received data which correspond to the action the robot needs to perform in the normal motion state, comprises:
sending, by the logical processing layer, a motion interruption message to the control layer via the I²C interface, when the logical processing layer determines that the robot is currently in the abnormal motion state;
sending, by the controlling layer, an acknowledgement to the logical processing layer in response after having received the motion interruption message;
stopping, by the controlling layer, to send the received data which correspond to the action the robot needs to perform in the normal motion state to a servo control system of the robot, and storing the received data which correspond to the action the robot needs to perform in the normal motion state.

8. The method of claim 2, wherein the step of based on the received data which correspond to the action the robot needs to perform in the normal motion state and the restoring time, controlling the robot to continue to perform the corresponding action after the robot returns to the normal motion state further comprises:
sending, by the logical processing layer, a recover message to the controlling layer via the I²C interface, when detecting that the robot returns to the normal motion state;
based on the received data which correspond to the action the robot needs to perform in the normal motion state and the restoring time, determining, by the logical processing layer, the corresponding action after the robot returns to the normal motion state, and sending data corresponding to the corresponding action after the robot returns to the normal motion state to the controlling layer;
sending, by the controlling layer, an acknowledgement to the logical processing layer in response, when receiving the recover message, and controlling the robot to continue to perform the corresponding action after the robot returns to the normal motion state, based on the data corresponding to the corresponding action after the robot returns to the normal motion state.

9. The method of claim 5, wherein the offset data is identified based on a length of each of frames of the sub-action $A_m$, how many frames the sub-action $A_m$ contains and how much time each of the frames takes are defined by a parameter of frame state in a file of the sub-action $A_m$.

10. The method of claim 9, wherein the step of sending all the data corresponding to the sub-action $A_m$ and the offset data to the controlling layer comprises:
sending, by the logical processing layer, the file of the sub-action Am and the offset data to the controlling layer.

11. A robot, comprising a memory and a processor, wherein the memory is configured to store program instructions, the processor is configured to execute the program instructions and perform a method for controlling motion of the robot, the method comprises:
acquiring current motion state of the robot, wherein motion states comprises normal motion state and abnormal motion state;
when the robot is in the abnormal motion state, storing received data which correspond to an action the robot needs to perform in the normal motion state;
when it is detected that the robot returns to the normal motion state, acquiring restoring time spent for the robot to return from the abnormal motion state to the normal motion state; and
based on the received data which correspond to the action the robot needs to perform in the normal motion state and the restoring time, controlling the robot to continue to perform a corresponding action after the robot returns to the normal motion state;
wherein the step of based on the received data which correspond to the action the robot needs to perform in the normal motion state and the restoring time, controlling the robot to continue to perform the corresponding action after the robot returns to the normal motion state comprises:
based on the received data which correspond to the action the robot needs to perform in the normal motion state, acquiring necessary time $T_n, T_{(n+1)}, \ldots, T_{(n+k)}, \ldots, T_{(m-1)}$ corresponding to different actions $A_n, A_{(n+1)}, \ldots, A_{(n+k)}, \ldots, A_{(m-1)}$ and a delay T', wherein $T_n+T_{(n+1)}+\ldots+T_{(n+k)}+\ldots+T_{(m-1)}+T'=T$:
if $T'<T_m$, taking an action $A_m$ corresponding to the time $T_m$ as the action that the robot needs to perform after returning to the normal motion state; and
controlling the robot which has returned to the normal motion state to continue to perform the action $A_m$ by a controlling layer in a motion control system of the robot.

12. The robot of claim 11, wherein the motion control system further comprises a logical processing layer connected to the controlling layer via a I²C interface, and the acquiring the current motion state of the robot comprises:
acquiring periodically motion data detected by a sensor installed in the robot by the logical processing layer, wherein the motion data is read from the controlling layer via the I²C interface; and
based on the acquired motion data, determining, by the logical processing layer, the current motion state of the robot.

13. The robot of claim 12, wherein the acquiring the restoring time spent for the robot to return from the abnormal motion state to the normal motion state comprises:
based on the acquired motion data, determining a first time point where the robot enters the abnormal motion state, and a second time point where the robot returns to the normal motion state; and
taking a difference value between the first time point and the second time point as the restoring time.

14. The robot of claim 13, wherein
the action the robot needs to perform in the normal motion state comprises a plurality of sub-actions;
the action $A_m$ is one sub-action $A_m$ of the plurality of sub-actions, begin time of $A_m$ is no later than the second time point, and end time of $A_m$ is later than the second time point.

15. The robot of claim 14, wherein the controlling the robot to continue to perform the corresponding action after the robot returns to the normal motion state comprises:
acquiring all, data corresponding to the sub-action $A_m$ and offset data, wherein the offset data correspond to a portion of the sub-action $A_m$ which has been performed before the second time point;
sending all the data corresponding to the sub-action $A_m$ and the offset data to a controlling layer; and
controlling the robot to continue to perform operations corresponding to all data of the sub-action $A_m$ except for the offset data.

16. A non-transitory readable medium, comprising program instructions that, when executed by a processor, cause the processor to perform a method for controlling motion of a robot, the method comprises:
  acquiring, current motion state of the robot, wherein motion states comprises normal motion state and abnormal motion state;
  when the robot is in the abnormal motion state, storing received data which correspond to an action the robot needs to perform in the normal motion state;
  when it is detected that the robot returns to the normal motion state, acquiring restoring time spent for the robot to return from the abnormal motion state to the normal motion state; and
  based on the received data which correspond to the action the robot needs to perform in the normal motion state and the restoring time, controlling the robot to continue to perform a corresponding action after the robot returns to the normal motion state:
  wherein the step of based on the received data which correspond to the action the robot needs to perform in the normal motion state and the restoring time, controlling robot to continue to perform the corresponding action after the robot returns to the normal motion state comprises:
  based on the received data which correspond to the action the robot needs to perform in the normal motion state, acquiring necessary time $T_n$, $T_{(n+1)}$, ..., $T_{(n+k)}$, ..., $T_{(m-1)}$ corresponding to different actions $A_n$, $A_{(n+1)}$, ..., $A_{(n+k)}$, ..., $A_{(m-1)}$ and a delay T', wherein $T_n + T_{(n+1)} + ... + T_{(n+k)} + ... + T_{(m-1)} + T' = T$:
  if $T' < T_m$, taking an action $A_m$ corresponding to the time $T_m$ as the action that the robot needs to perform after returning to the normal motion state; and
  controlling the robot which has returned to the normal motion state to continue to perform the action $A_m$ by a controlling layer in a motion control system of the robot.

17. The non-transitory readable medium of claim 16, wherein the motion control system further comprises a logical processing layer connected to the controlling layer via a I²C interface, and the acquiring the current motion state of the robot comprises:
  acquiring periodically motion data detected by a sensor installed in the robot by the logical processing layer, wherein the motion data is read from the controlling layer via the I²C interface; and
  based on the acquired motion data, determining, by the logical processing layer, the current motion state of the robot.

18. The non-transitory readable medium of claim 17, wherein the acquiring the restoring time spent for the robot to return from the abnormal motion state to the normal motion state comprises:
  based on the acquired motion data, determining a first time point where the robot enters the abnormal motion state, and a second time point where the robot returns to the normal motion state; and
  taking a difference value between the first time point and the second time point as the restoring time.

19. The non-transitory readable medium of claim 18, wherein
  the action the robot needs to perform in the normal motion state comprises a plurality of sub-actions;
  the action $A_m$ is one sub-action $A_m$ of the plurality of sub-actions, begin time of $A_m$ is no later than the second time point and end time of $A_m$ is later than the second time point.

20. The non-transitory readable medium of claim 19, wherein the controlling the robot to continue to perform the corresponding action after the robot returns to the normal motion state comprises:
  acquiring all data corresponding to the sub-action $A_m$ and offset data, wherein the offset data correspond to a portion of the sub-action $A_m$ which has been performed before the second time point;
  sending all the data corresponding to the sub-action $A_m$ and the offset data to the controlling layer; and
  controlling the robot to continue to perform operations corresponding to all data of the sub-action $A_m$ except for the offset data.

* * * * *